(12) United States Patent
Pondo et al.

(10) Patent No.: US 7,008,711 B2
(45) Date of Patent: Mar. 7, 2006

(54) THERMALLY INTEGRATED FUEL CELL POWER SYSTEM

(75) Inventors: Joseph M. Pondo, Bolingbrook, IL (US); David J. Goodwin, Willowsprings, IL (US); Chakravarthy Sishtla, Woodridge, IL (US); Randy J. Petri, Downers Grove, IL (US); Robert J. Remick, Bolingbrook, IL (US)

(73) Assignee: Gas Technology Institute, Des Plaines, IL (US)

( * ) Notice: Subject to any disclaimer, the term of this patent is extended or adjusted under 35 U.S.C. 154(b) by 304 days.

(21) Appl. No.: 10/351,790

(22) Filed: Jan. 27, 2003

(65) Prior Publication Data

US 2004/0146763 A1    Jul. 29, 2004

(51) Int. Cl.
*H01M 8/04* (2006.01)
*H01M 8/10* (2006.01)
*H01M 8/18* (2006.01)

(52) U.S. Cl. ........................... 429/26; 429/31; 429/19; 429/20

(58) Field of Classification Search ................. 429/26, 429/19, 20, 37, 31
See application file for complete search history.

(56) References Cited

U.S. PATENT DOCUMENTS

| | | | |
|---|---|---|---|
| 4,629,537 A * | 12/1986 | Hsu | 429/32 |
| 4,943,494 A | 7/1990 | Riley | 429/30 |
| 5,338,622 A * | 8/1994 | Hsu et al. | 429/26 |
| 5,612,149 A | 3/1997 | Hartvigsen et al. | 429/26 |
| 5,736,268 A | 4/1998 | Pondo | 429/12 |
| 5,746,985 A * | 5/1998 | Takahashi | 422/173 |
| 5,763,114 A | 6/1998 | Khandkar et al. | 429/20 |
| 5,906,898 A | 5/1999 | Pondo | 429/34 |
| 6,492,050 B1 * | 12/2002 | Sammes | 429/31 |

* cited by examiner

*Primary Examiner*—Patrick Joseph Ryan
*Assistant Examiner*—Thomas H. Parsons
(74) *Attorney, Agent, or Firm*—Mark E. Fejer

(57) ABSTRACT

A fuel cell power system having at least one fuel cell stack, at least one fuel processor in fluid communication with the at least one fuel cell stack and heat exchangers for transferring heat between the at least one fuel cell stack and the at least one fuel processor in which the at least one fuel cell stack and the at least one fuel processor are circumferentially surrounded by a plurality concentric heat exchanger shell assemblies.

39 Claims, 3 Drawing Sheets

THERMALLY INTEGRATED FUEL CELL POWER SYSTEM

BACKGROUND OF THE INVENTION

1. Field of the Invention

This invention relates to a fuel cell power system comprising a fuel cell stack, fuel processor and heat exchangers. More particularly, this invention relates to a fuel cell power system in which the fuel cell stack, fuel processor and heat exchange components are disposed in one thermally integrated assembly. The fuel cell power system of this invention is particularly suitable for use with solid oxide fuel cells and solid oxide fuel cell stacks.

2. Description of Related Art

A fuel cell is an electrochemical device in which the chemical energy of a reaction between a fuel and an oxidant is converted directly into electricity. The basic fuel cell unit comprises an electrolyte layer in contact with a porous anode and cathode on either side. In a typical fuel cell, a gaseous or liquid fuel is continuously fed to the anode electrode, sometimes referred to as the fuel electrode, and an oxidant, such as oxygen from air, is continuously fed to the cathode electrode, sometimes referred to as the air electrode, and electrochemical reactions occur at the electrodes to produce an electric current. Due to the limited electricity generating capacity of individual fuel cell units, a plurality of fuel cell units are typically stacked one on top of another with a bipolar separator plate separating the fuel cell units between the anode electrode of one fuel cell unit and the cathode electrode of an adjacent fuel cell unit.

There are a number of different fuel cell types which are classified based upon a variety of categories including the combination of type of fuel and oxidant, whether the fuel is processed external to or inside the fuel cell, the type of electrolyte, e.g. solid oxides, phosphoric acid, molten carbonate and proton exchange membranes, the temperature of operation and whether the reactants are provided to the fuel cell by internal or external manifolds. The system of this invention is particularly suitable for use in connection with solid oxide fuel cells, which, of the common known fuel cell types, have the highest operating temperatures, in the range of about 800° C. to about 1000° C. The benefits of using higher operating temperature fuel cells include the possibility of using a greater variety of fuels, including CO and methane.

However, a significant issue in the operation of high temperature fuel cells is heat management, in particular minimizing the amount of heat loss. Conventional fuel cell power systems for operation of high temperature fuel cell stacks are limited in thermal integration for heat recovery because of the use of discrete heat exchangers, which require extensive ducting and thermal insulation. This approach has made these fuel cell systems both complex and costly to manufacture and tends to place constraints on fuel cell stack design configurations to support the required plumbing system. To address this issue, U.S. Pat. No. 5,612,149 to Hartvigsen et al. teaches a fuel cell module with a fuel cell column having at least one fuel cell stack, mated with the planar wall of a heat exchanger, wherein the fuel cell column and heat exchanger are mounted to a support structure, and which define an air plenum between the fuel cell column and the planar wall of the heat exchanger, thereby eliminating the ductwork and insulation requirements associated with heat exchange systems while increasing the efficiency of the heat exchanger. However, the disclosed design only provides for single stage heating of the oxidant inlet by a single heat exchange which would not raise the ambient air for the oxidant to the required operating temperature range of the solid oxide fuel cell stack due to the very limited surface and residence time to which the gas would be subjected. In addition, other key requirements such as fuel feedstock preheating prior to reformation, heating needs during system start-up from ambient conditions and partial load operations are also not addressed by this disclosure.

U.S. Pat. No. 4,943,494 to Riley teaches porous refractory ceramic blocks arranged in a stack configuration providing both support and coupling means for a plurality of solid oxide fuel cells. The ceramic blocks and the outer steel shell of the structure provide connections for the air, fuel and process effluent flows. One of the main objects of the disclosed structure is to provide a support structure that integrates fuel, air and effluent flow channels for reduction of interconnection complexities for cost reduction and commercial feasibility. However, the disclosed structure does not provide any means for heat recovery, which is critical for efficient operation and cost effective system operation.

U.S. Pat. No. 5,763,114 to Khandkar et al. teaches a thermally integrated reformer located inside of a furnace structure housing solid oxide fuel cell stacks. In this system, heat from the fuel cell oxidation reaction is recovered to support the endothermic reformation reaction. Heat is recovered by heat transfer to the reformer by radiation from the fuel cell stack and by forced convection from the exhausting airflow exiting the furnace. Although addressing the need for heat recovery and transfer to the fuel feedstock as well as support for the reformation reaction, the heating of the air for the oxidant feedstock is not integrated and is provided by external means resulting in system inefficiency and fabrication complexity. An apparatus for heat recovery is also taught by U.S. Pat. No. 5,906,898 to Pondo, which teaches a fuel cell stack with oxidant flow paths between separator plates and along the outside surface of the fuel cell stack for control of the heat generated by the fuel cells. This patent also teaches direct heating of the oxidant feed gas by using recovered heat from the fuel cell stack by way of heat exchange panels mounted externally on the fuel cell stack, providing oxidant inlet flow paths to the fuel cell stack. However, the highest temperature effluent stream is not fully utilized in this configuration for heat recovery because of its containment inside of the fuel cell stack in the oxidant outlet internal manifold.

SUMMARY OF THE INVENTION

Accordingly, it is one object of this invention to provide a fuel cell power system in which all of the principle components, the fuel cell stack, fuel processor and heat exchanger requirements are contained in a single thermally integrated assembly.

It is another object of this invention to provide a fuel cell power system with improved efficiency over conventional fuel cell power systems.

It is yet a further object of this invention to provide a fuel cell power system that is simpler in design thereby providing easier manufacture at lower costs than conventional systems.

It is a further object of this invention to provide a fuel cell power system that is readily scalable.

These and other objects of this invention are addressed by a thermally integrated fuel cell power system in which the high temperature elements are disposed inside of multiple concentric heat exchanger shell assemblies. The highest temperature components are located within the core of the assembly elements. The heat generation sources, the fuel cell stack and system burner, are placed close-coupled at the center of the concentric heat exchanger assemblies together with the main heating loads, the endothermic reformer and fuel and oxidant feeds. This design can be flexibly configured to support any combination of gas flows and heat transfer temperature differences between the heat exchanger shells. In general, this concept facilitates the maximizing of system efficiencies by allowing for minimum parasitic thermal losses by means of close-coupling of the components and providing an easy and cost effective design for mass production.

In accordance with one preferred embodiment of this invention, the fuel processor is a steam reformer. However, any suitable fuel processor may be employed including partial oxidation, auto-thermal reforming, plasma reforming, and direct internal reforming within the fuel cell stack with anode effluent recycle. In addition, all forms of gaseous and liquid fuels may be employed as a feedstock including, but not limited to, natural gas, methanol, diesel/JP8, gasoline and hydrogen.

The energy required to support the operation of the fuel cell power system of this invention is provided by heat recovery from the oxidation process of the fuel cell stack and, when required, from the system burner, for example at partial electrical loads or during start-up. In general, the sources of heat are forced convection from the cathode effluent, transfer through the concentric heat exchange shells, radiation from the stack and, if required, combustion of fuel by the system burner. The uses of this heat include heat transferred to the reformer and the incoming fuel and oxidant to attain stack operating temperatures. The thermally integrated fuel cell power system of this invention provides for greatly increased efficiency by close-coupling of high temperature components and providing for the elimination of connecting ductwork and insulation that is required by conventional systems utilizing discrete heat exchanger and fuel processor elements.

More particularly, the fuel cell power system of this invention comprises at least one concentric heat exchanger structure circumferentially surrounding a centrally disposed core space and at least one fuel cell stack disposed in the centrally disposed core space. The fuel cell stack is in heat exchange relationship and fluid communication with the at least one concentric heat exchange structure. In accordance with one preferred embodiment of this invention, at least one fuel processor in fluid communication with the at least one fuel cell stack is disposed in the centrally disposed core space.

BRIEF DESCRIPTION OF THE DRAWINGS

These and other objects and features of this invention will be better understood from the following detailed description taken in conjunction with the drawings wherein.

DETAILED DESCRIPTION OF THE PRESENTLY PREFERRED EMBODIMENTS

As previously stated, the basic approach of this invention is the thermal integration of system components in which the highest temperature components are located and enclosed within the core of the assembly. Concentric, or layered, walls can then be employed to accomplish any system heat management goal. For example, in accordance with one embodiment, the highest temperature of the fuel cell power system of this invention is maintained within the core and each subsequent annulus, ordered from the inside, or assembly core, to the outside is engineered to operate at a decreased temperature. In accordance with another embodiment, the highest temperature of the fuel cell power system is maintained in the core, but with the first annulus out from the core containing the coolest stream, for instance, ambient inlet air, to maximize heat removal from the fuel cell stack by means of a tailored combination of conduction, convection and radiation. Embodiments may also be employed to support any combination of these extreme approaches.

Figure 1:
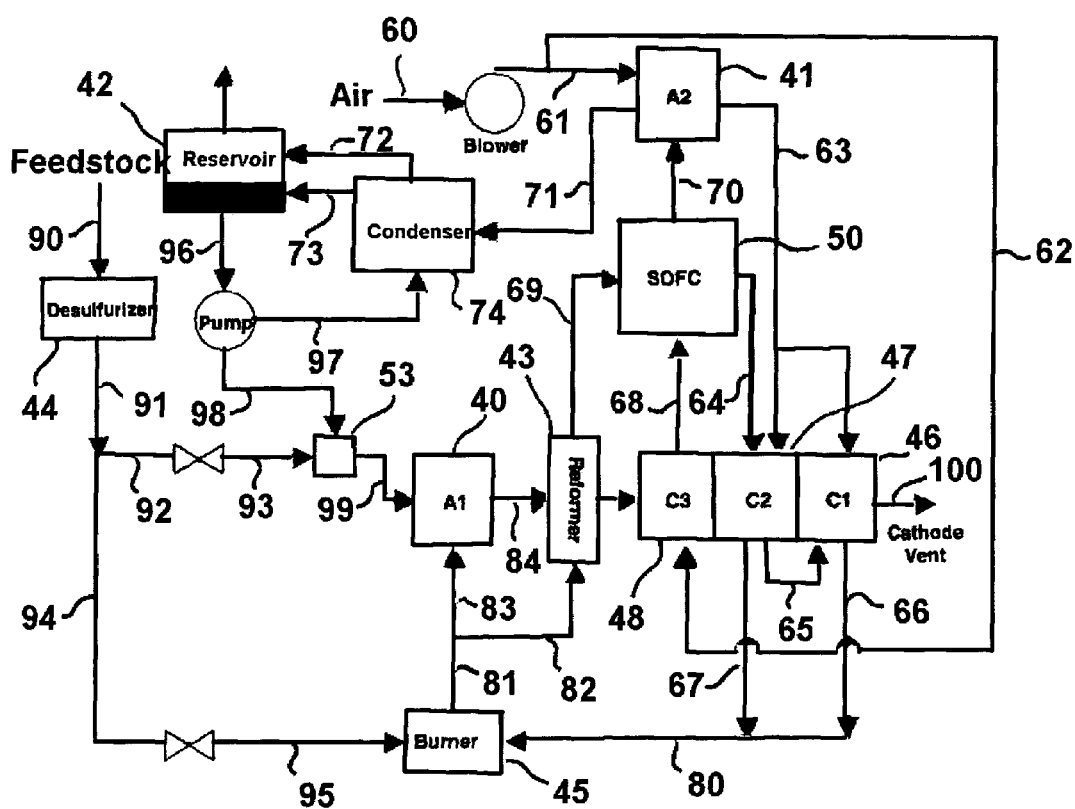
FIG. 1 is a schematic diagram of a fuel cell power system in accordance with one embodiment of this invention.

FIG. 1 is a schematic diagram representative of the operation of one embodiment of the thermally integrated fuel cell power system of this invention. As previously stated, the system is capable of operating with all forms of fuel cell fuels including, but not limited to, natural gas, methanol, diesel/JP8, gasoline and hydrogen. In the embodiment shown in FIG. 1, the feedstock/fuel, which in this exemplary embodiment is natural gas, is introduced through line 90 into desulfurizer 44 prior to entering the thermally integrated power system section, which comprises reformer 43, solid oxide fuel cell (SOFC) 50 and heat exchangers 46, 47, 48, to reduce sulfur levels to protect the fuel cell stack from poisoning. Alternatively, desulfurization by means of a hot process, such as a zinc-oxide bed, can be incorporated into the fuel cell power system of this invention in an annulus disposed between two adjacent heat exchange structures in which the temperatures have been appropriately engineered.

As shown in FIG. 1, after passing through desulfurizer 44, a portion of the desulfurized feedstock/fuel is conveyed through lines 91, 92 and 93 into mixer 53 in which it is mixed with water conveyed from water reservoir 42 through lines 96 and 98 into mixer 53. The feedstock/water mixture is then conveyed through line 99 into heat exchanger 40 for preheating and steam generation, after which the resulting preheated feedstock/steam mixture is conveyed through line 84 into steam reformer 43. Steam reformer 43 converts the gas stream to a hydrogen-rich gas composition that is fed through line 69 to the anode of the solid oxide fuel cell 50. A second portion of the desulfurized feedstock/fuel is conveyed through lines 94 and 95 to system burner 45 which produces combustion products that are conveyed to heat exchanger 40 through lines 81 and 83 for preheating of the fuel/water mixture and that are conveyed through line 82 to reformer 43 provide any heat may be required for reformation of the feedstock fuel. In accordance with one embodiment of the fuel cell power system of this invention, the system burner and steam reformer are replaced with a partial oxidation reformer which provides the heat for startup and temperature maintenance as well as processing the feedstock stream for introduction into the fuel cell stack 50. In accordance with one embodiment of this invention, the effluent gas from the anode, depleted of hydrogen and high in water content from the internal fuel cell reactions, is exhausted from solid oxide fuel cell 50 and routed through line 70 to an external heat exchanger 41 for condensation of the water vapor and preheating of air that is introduced into the system through lines 60 and 61. Alternatively, the anode exhaust gas is routed through line 71 to the condenser 74, the output of which is returned through lines 72, 73 to water reservoir 42. In accordance with one embodiment of this invention, a portion of the water from water reservoir 42 is flowed through line 97 to condenser 74. In practice, external heat exchanger 41 is capable of condensing sufficient water to supply the water required in the steam reforming process. In accordance with an alternative embodiment, the water for fuel processing is derived from an appropriate amount of recycled anode outlet gases with the remaining portion of the anode effluent being routed through line 80 to the system burner to provide the full or partial amount of required heating duty. This recycling may be facilitated by means of a pump or other mechanical methods.

In accordance with one embodiment of this invention, ambient air is used to provide the oxygen required by the fuel cell and system burner or partial oxidation reformation. The air is preheated, as previously indicated, in heat exchanger 41. From there, the preheated air is conveyed through line 63 to heat exchanger section 47 of the shell heat exchanger assembly of the system. Final heating to operating temperature is provided by the system burner 45, or alternatively, a partial oxidation reformer. The heated air is then supplied to heat exchanger section 46 of the shell heat exchanger assembly to provide uniform internal temperatures and installation to the internal high temperature components of the system before introduction to the cathodes of the fuel cell stack. The cathode effluent then flows through line 64 through the heat exchanger section 47, preheating the incoming air gas stream, and exits through line 65 into the heat exchanger section 46 of the shell heat exchanger assembly prior to venting through line 100 to the ambient atmosphere, or alternatively through lines 66 and 67 for recycling to burner 45. In accordance with one embodiment of this invention, an additional heat transfer device, such as a coil, may be added to heat exchanger section 46 or 47 to provide for additional heat duty such as water heating. In accordance with one embodiment of this invention, a portion of the air flowing through line 61 is diverted to line 62 through which it flows to heat exchanger 48 and then, having been preheated, through line 68 to the cathode of the solid oxide fuel cell stack 50.

Figure 2:
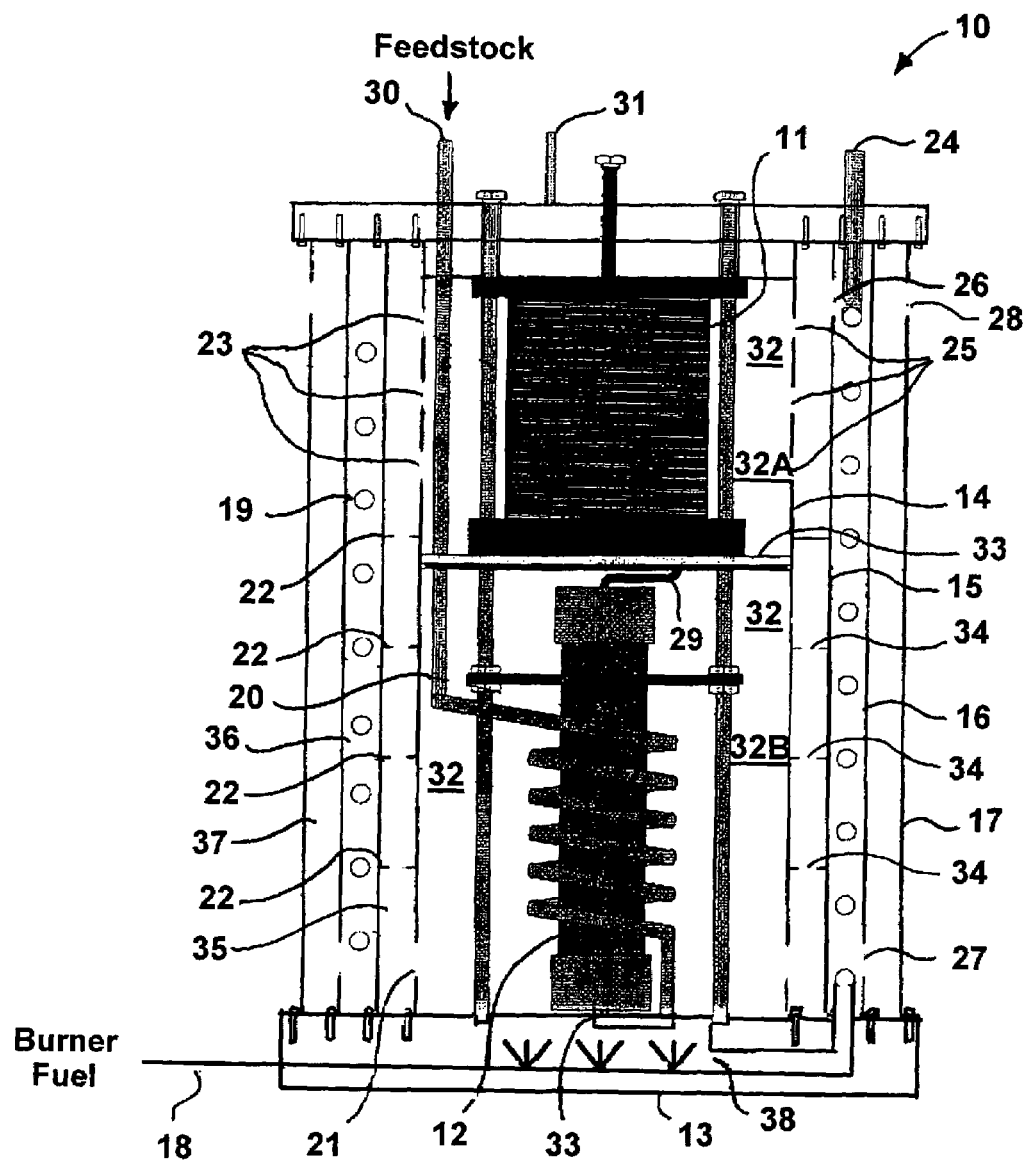
FIG. 2 is a transverse sectional view of a fuel cell power system in accordance with one embodiment of this invention.

A thermally integrated fuel cell power system 10 in accordance with one embodiment of this invention shown in FIG. 2 comprises a plurality of heat exchange structures or shell layers 14, 15, 16, 17 circumferentially surrounding a centrally disposed core space 32, whereby heat exchange structure 14 is the innermost shell layer (closest to the centrally disposed core space), heat exchange structure 15 is the next innermost shell layer, also referred to herein as the first intermediate shell layer, heat exchange structure 16 is the next innermost shell layer, also referred to herein as the second intermediate shell layer, and heat exchange structure 17 is the outermost shell layer. Although depicted as being cylindrical in shape, it will be apparent to those skilled in the art that other configurations for the heat exchange structures, such as a plurality of layers of adjacent flat panels enclosing the centrally disposed core space, are also possible and such other configurations are considered to be within the scope of this invention. In accordance with one embodiment of this invention, the centrally disposed core space 32 is transversely separated into two compartments 32A and 32B by separator 33 whereby fuel cell stack 11 is disposed in compartment 32A and fuel processor 12 is disposed in compartment 32B. For embodiments of this invention in which processing of the feedstock is performed internally in fuel cell stack 11, as, for example, in the case of an internal reforming fuel cell stack, separation of the centrally disposed core space into two compartments is not necessary.

As shown in FIG. 2, heat exchange shell layers 14, 15, 16, 17 form a plurality of annular spaces 35, 36, 37 between adjacent shell layers, whereby the innermost annular space 35 is formed between shell layers 14 and 15, an intermediate annular space 36 is formed between shell layers 15 and 16, and the outermost annular space 37 is formed between shell layers 16 and 17.

Disposed within centrally disposed core space 32 is at least one fuel cell stack 11, which is in heat exchange relationship and fluid communication with at least one of the concentric heat exchange shell layers. Also disposed within the centrally disposed core space 32 is at least one fuel processor 12, which at least one fuel processor 12 is in fluid communication with the at least one fuel cell stack 11. In accordance with one preferred embodiment of this invention, fuel processor 12 is a steam reformer. In the embodiment shown in FIG. 2, steam reformer 12 is surrounded by a steam coil heat exchanger 20 having a feedstock inlet 30 through which a fuel to be processed by fuel processor 12 is introduced into the fuel cell power system 10 and a steam/feedstock outlet 33 in fluid communication with fuel processor 12 through which the feedstock to be processed is introduced into fuel processor 12 for conversion to a fuel suitable for use in fuel cell stack 11. Processed fuel is conveyed from fuel processor 12 to the anode of fuel cell stack 11 through fuel cell fuel supply line 29.

To provide heat for heating fuel processor 12 and steam coil heat exchanger 20, the system further comprises at least one system burner 13 having a burner outlet in fluid communication with the centrally disposed core space 32, whereby combustion products produced by system burner 13 flow into centrally disposed core space 32. In addition to providing heat for promotion of the reforming reaction in fuel processor 12, system burner 13 may be used to provide the heat input for system start-up from ambient temperature, inlet air heating and any additional heat duty required for maintenance of the system operating temperature. In accordance with one preferred embodiment of this invention, a heat exchange coil 19 is provided having a coil air inlet port 24 through which air is introduced into the coil and a coil air outlet port 38, which is in fluid communication with the outlet end of system burner 13, whereby the air, which has been preheated in heat exchange coil 19, is used for combustion of the burner fuel that is provided through system burner fuel supply line 18 to system burner 13. In accordance with one preferred embodiment, the burner fuel is natural gas.

As previously described in connection with FIG. 1, desulfurized feedstock, for example natural gas, is introduced into fuel cell power system 10 through feedstock inlet 30 of steam coil heat exchanger 20 through which it is conveyed into fuel processor 12 for conversion and into system burner fuel supply line 18 through which it is conveyed to system burner 13 for combustion. As shown in FIG. 1, in accordance with one embodiment of this invention, the desulfurized feedstock is conveyed through line 93 into mixer 53 in which it is mixed with water. It is this feedstock/water mixture that is introduced through feedstock inlet 30 into steam coil heat exchanger 20. Steam coil heat exchanger 20 vaporizes the water in the feedstock/water mixture and preheats the mixture prior to introduction into the fuel processor 12, which in the instant example is a steam reformer. In fuel processor 12, the feedstock is converted to a hydrogen-rich gas which is fed through fuel cell fuel supply line 29 into fuel cell stack 11. Anode exhaust gas from the fuel cell stack 11 is exhausted through vent 31.

In accordance with one embodiment of this invention, air used in the combustion of the feedstock/fuel in system burner 13 is preheated in an external heat exchanger 41, shown in FIG. 1, after which it is then introduced through coil air inlet port 24 into heat exchange coil 19 in which it is further preheated prior to being conveyed through coil air outlet 38 to the system burner 13.

Figure 3:
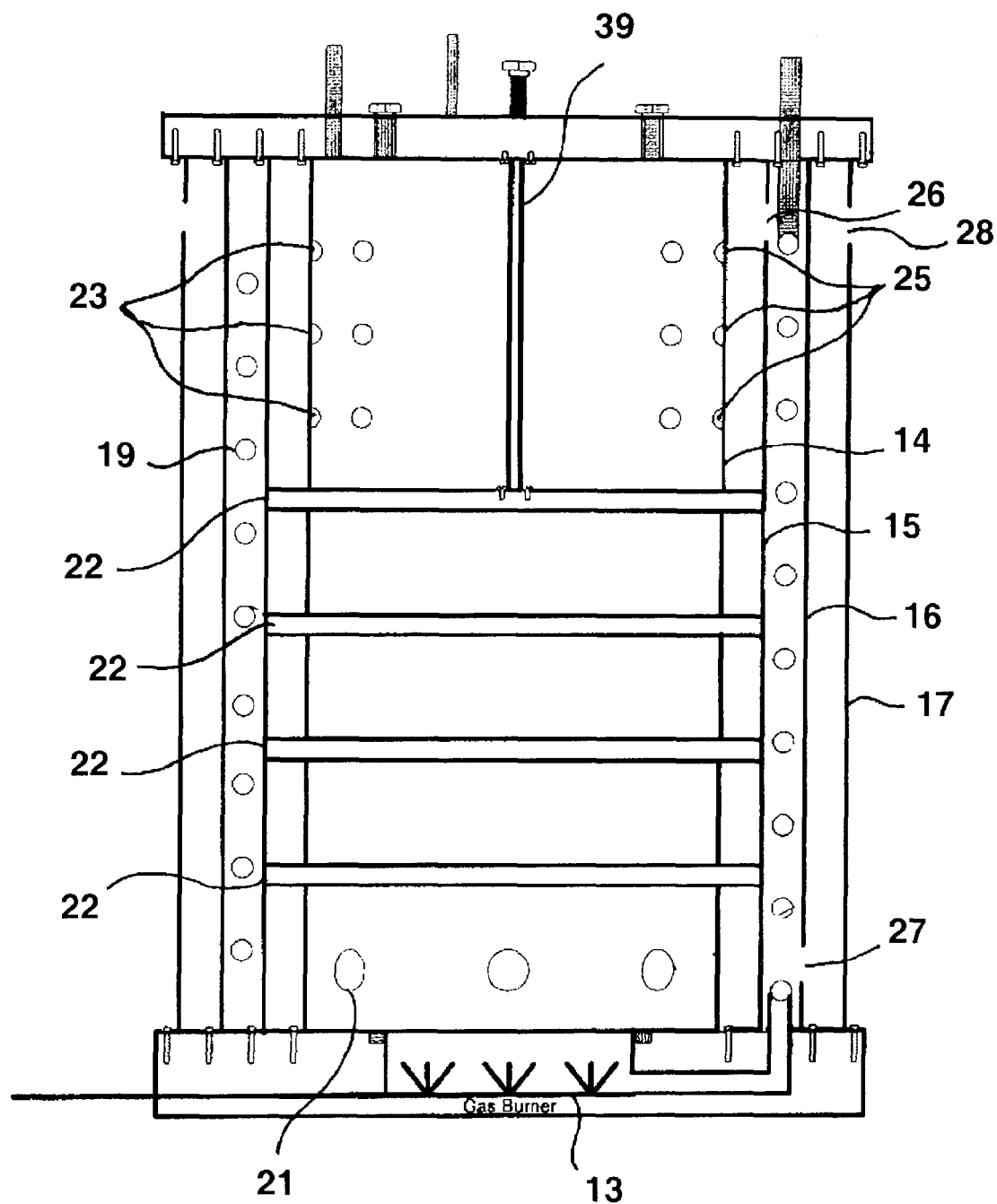
FIG. 3 is a sectional view of the fuel cell power system shown in FIG. 2 with the innermost heat exchange structure completely surrounding the fuel cell stack and fuel processor assembly.

In accordance with one embodiment of this invention, the innermost concentric heat exchange structure 14 forms at least one burner effluent inlet port 21 through which at least a portion of the system burner effluent, i.e. combustion products (or vitiated air), is conveyed into the innermost annular space 35 disposed between heat exchange structure 14 and heat exchange structure 15. Disposed within the innermost annular space 35 at strategic elevations to provide uniform heated airflow around the circumference of the high temperature elements of the system, namely the fuel cell stack 11 and the fuel processor 12, in accordance with one preferred embodiment of this invention, are a plurality of gas flow ring baffles 22, each of which forms at least one effluent opening 34 for passage of the burner effluent along the entire elevation of the innermost heat exchange structure 14. In accordance with this embodiment, the innermost heat exchange structure forms at least one vitiated air inlet port 23, providing fluid communication between the innermost annular space 35 and fuel cell stack 11. By virtue of this arrangement, the hot vitiated air produced by system burner 13 can be conveyed into the cathode of the fuel cell stack 11. In accordance with one embodiment, the vitiated air is conveyed through the at least one vitiated air port 23 into an external manifold area for introduction to the cathode. Alternative embodiments include duct connections for a fuel cell stack which is either internally or externally manifolded. In accordance with one embodiment of this invention, the innermost heat exchange structure 14 forms at least one cathode effluent port 25 through which cathode effluent gas, depleted of oxygen from the internal fuel cell reactions, flows into the innermost annular space 35. To provide separation of the inlet oxidant air to the fuel cell stack 11 flowing through the at least one vitiated air port 23 from the cathode effluent gas flowing through the at least one first cathode effluent port 25, a compartment separator bulkhead 39 as shown in FIG. 3 is provided. From the innermost annular space 35, the vitiated air flows through a second cathode effluent port 26 formed by the intermediate heat exchange structure 15 into the second annular space 36 disposed between the second heat exchange structure 15 and the third heat exchange structure 16. In this manner, heat from the vitiated air can be transferred into heat exchange coil 19 for use in preheating of the air flowing through heat exchange coil 19 to system burner 13 as earlier described. The vitiated air, having transferred its heat to heat exchange coil 19, is then exhausted through a third cathode effluent port 27 formed by the third heat exchange structure 16 into the outermost annular space 37 from which it may be exhausted to the atmosphere through a fourth cathode effluent port 28 formed by the outermost heat exchange structure 17.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

We claim:

1. A fuel cell power system comprising:
   at least one concentric heat exchanger structure circumferentially surrounding a centrally disposed core space;
   at least one fuel cell stack disposed in said centrally disposed core space, said at least one fuel cell stack in heat exchange relationship with said at least one concentric heat exchange structure;
   fluid communication means for providing communication of a heat exchange fluid disposed within said at least one concentric heat exchange structure with said at least one fuel cell stack; and
   at least one fuel processor disposed in said centrally disposed core space, said at least one fuel processor in fluid communication with said at least one fuel cell stack.

2. A fuel cell power system in accordance with claim 1 further comprising at least one system burner disposed in said centrally disposed core space and adapted to provide heat to said at least one fuel processor.

3. A fuel cell power system in accordance with claim 2, wherein said centrally disposed core space is circumferentially surrounded by four said concentric heat exchange structures, a first said concentric heat exchange structure corresponding to an innermost said concentric heat exchange structure, a fourth said concentric heat exchange structure corresponding to an outermost said concentric heat exchange structure, a second said concentric heat exchange structure disposed between said first said concentric heat exchange structure and said fourth said concentric heat exchange structure, and a third said concentric heat exchange structure disposed between said second said concentric heat exchange structure and said fourth said concentric heat exchange structure.

4. A fuel cell power system in accordance with claim 3, wherein said first concentric heat exchange structure forms a burner effluent inlet port in fluid communication with said at least one system burner, whereby products of combustion produced by said system burner flow into an annular space disposed between said first concentric heat exchange structure and said second concentric heat exchange structure.

5. A fuel cell power system in accordance with claim 4 further comprising a plurality of gas flow ring baffles disposed in said annular space between said first concentric heat exchange structure and said second concentric heat exchange structure, said gas flow ring baffles forming openings whereby said products of combustion are distributed within said annular space.

6. A fuel cell power system in accordance with claim 5, wherein said first concentric heat exchange structure forms at least one heated air inlet port providing a fluid communication between said annular space and said centrally disposed core space surrounding said at least one fuel cell stack.

7. A fuel cell power system in accordance with claim 5, wherein said first concentric heat exchange structure forms at least one first cathode effluent outlet port, said at least one first cathode effluent outlet port providing fluid communication between said centrally disposed core space and said annular space.

8. A fuel cell power system in accordance with claim 7, wherein said second concentric heat exchange structure forms at least one second cathode effluent outlet port providing a fluid communication between said annular space and a second annular space disposed between said second concentric heat exchange structure and said third concentric heat exchange structure.

9. A fuel cell power system in accordance with claim 8, wherein said third concentric heat exchange structure forms at least one third cathode effluent outlet port providing a fluid communication between said second annular space and a third annular space disposed between said second concentric heat exchange structure and said third concentric heat exchange structure.

10. A fuel cell power system in accordance with claim 9, wherein said fourth concentric heat exchange structure forms at least one fourth cathode effluent outlet port providing fluid communication between said third annular space and an atmosphere around said fuel cell power system.

11. A fuel cell power system in accordance with claim 10 further comprising a circumferential heat exchange coil disposed around said centrally disposed core space in said second annular space and having an air inlet port and a preheated air outlet port, said preheated air outlet port in fluid communication with said at least one burner system.

12. A fuel cell power system in accordance with claim 5, wherein said first concentric heat exchange structure forms at least on heated air inlet port providing a direct fluid communication between said annular space and a cathode electrode of said at least one fuel cell stack.

13. A fuel cell power system in accordance with claim 2 further comprising a circumferential heat exchange coil disposed around said centrally disposed core space having an air inlet port and a preheated air outlet port, said preheated air outlet port in fluid communication with said at least one burner system.

14. A fuel cell power system in accordance with claim 1, wherein said centrally disposed core space is circumferentially surrounded by a plurality of said concentric heat exchange structures.

15. A fuel cell power system in accordance with claim 1, wherein said at least one fuel processor is a steam reformer.

16. A fuel cell power system in accordance with claim 1, wherein said at least one fuel processor is a partial oxidation reformer.

17. A fuel cell power system in accordance with claim 1, wherein said at least one fuel processor comprises a reformed fuel outlet in fluid communication with an anode electrode of said at least one fuel cell stack.

18. A fuel cell power system in accordance with claim 1, further comprising a steam coil heat exchanger disposed in said centrally disposed core space around said fuel processor and having a water/feedstock inlet opening in fluid communication with water and feedstock supplies and a steam/feedstock outlet opening in fluid communication with said at least one fuel processor.

19. A fuel cell power system in accordance with claim 1, wherein said at least one concentric heat exchange structure is at least partially thermally insulated.

20. A fuel cell power system in accordance with claim 1, wherein said at least one fuel processor is integral with said at least one fuel cell stack.

21. A fuel cell power system in accordance with claim 1 further comprising a core space divider whereby said centrally disposed core space is divided into a fuel cell stack section and a fuel processor section, said at least one fuel cell stack disposed in said fuel cell stack section and said at least one fuel processor disposed in said fuel processor section.

22. A fuel cell power system in accordance with claim 1, wherein said at least one fuel cell stack is a solid oxide fuel cell stack.

23. In a fuel cell power system comprising at least one fuel cell stack, at least one fuel processor in fluid communication with said at least one fuel cell stack and heat exchange means for transferring heat between said at least one fuel cell stack and said at least one fuel processor, the improvement comprising:
said at least one fuel cell stack and said at least one fuel processor circumferentially surrounded by a plurality of layers of concentric heat exchanger shell assemblies.

24. A fuel cell power system in accordance with claim 23, wherein said at least one fuel processor is integral with said at least one fuel cell stack.

25. A fuel cell power system in accordance with claim 23, wherein said at least one fuel processor is a partial oxidation reformer.

26. A fuel cell power system in accordance with claim 23, wherein said at least one fuel processor is a steam reformer.

27. A fuel cell power system in accordance with claim 26 further comprising at least one system burner having a burner outlet in fluid communication with an exterior of said at least one fuel processor whereby combustion products generated by said at least one system burner contact said at least one fuel processor.

28. A fuel cell power system in accordance with claim 27, wherein said plurality of layers of concentric heat exchanger shell assemblies comprises an innermost shell layer, an outermost shell layer spaced apart from said innermost shell layer, a first intermediate shell layer disposed between said innermost shell and said outermost shell and spaced apart from said innermost shell and said outermost shell, forming an innermost annular space between said innermost shall and said first intermediate shell layer, and a second intermediate shell layer disposed between said first intermediate shell layer and said outermost shell layer and spaced apart from said first intermediate shell layer and said outermost shell layer, forming an intermediate annular space between said first intermediate shell layer and said second intermediate shell layer and an outermost annular space between said second intermediate shell layer and said outermost shell layer.

29. A fuel cell power system in accordance with claim 28, wherein said innermost shell layer forms at least one burner effluent inlet port in fluid communication with said burner outlet, whereby at least a portion of said products of combustion flow into said innermost annular space.

30. A fuel cell power system in accordance with claim 29 further comprising a plurality of gas flow ring baffles disposed in said innermost annular space and forming openings whereby said products of combustion are distributed within said innermost annular space.

31. A fuel cell power system in accordance with claim 29, wherein said innermost shell layer forms at least one preheated air inlet port providing a fluid communication between said innermost annular space and a cathode of said at least one fuel cell stack.

32. A fuel cell power system in accordance with claim 29, wherein said innermost shell layer forms at least one cathode effluent outlet port providing fluid communication between said innermost annular space and a cathode effluent exhaust port of said at least one fuel cell stack.

33. A fuel cell power system in accordance with claim 32, wherein said first intermediate shell layer forms at least one intermediate cathode effluent outlet port providing fluid communication between said innermost annular space and said intermediate annular space.

34. A fuel cell power system in accordance with claim 33, wherein said second intermediate shell layer forms at least one additional cathode effluent outlet port providing fluid communication between said intermediate annular space and said outermost annular space.

35. A fuel cell power system in accordance with claim 34, wherein said outermost shell layer forms an outermost cathode effluent outlet port providing fluid communication between said outermost annular space and an atmosphere disposed around said fuel cell power system.

36. A fuel cell power system in accordance with claim 28 further comprising a heat exchange coil circumferentially disposed around said first intermediate shell layer in said intermediate annular space and having an air inlet port and a preheated air outlet port, said preheated air outlet port in fluid communication with said burner outlet.

37. A fuel cell power system in accordance with claim 28 further comprising a steam coil heat exchanger circumferentially disposed around said at least one fuel processor between said at least one fuel processor and said innermost shell layer and having a feedstock/water inlet opening in fluid communication with water and feedstock supplies and a feedstock/steam outlet opening in fluid communication with said at least one fuel processor.

38. A fuel cell power system in accordance with claim 37, wherein said at least one fuel cell stack comprises an anode effluent exhaust port in fluid communication with said feedstock/water inlet opening of said at least one steam coil heat exchanger.

39. A fuel cell power system in accordance with claim 28, wherein at least one of said shell layers is at least partially thermally insulated.

* * * * *